United States Patent
Lassmann et al.

(10) Patent No.: US 9,783,973 B2
(45) Date of Patent: Oct. 10, 2017

(54) WASTE DISPOSAL APPARATUS FOR AN AIRCRAFT AND AIRCRAFT COMPRISING THE WASTE DISPOSAL APPARATUS

(71) Applicant: APPARATEBAU GAUTING GmbH, Gauting (DE)

(72) Inventors: Holger Lassmann, Naundorf (DE); Juergen Scharschmied, Neuried (DE)

(73) Assignee: APPARATEBAU GAUTING GmbH, Gauting (DE)

( * ) Notice: Subject to any disclaimer, the term of this patent is extended or adjusted under 35 U.S.C. 154(b) by 191 days.

(21) Appl. No.: 14/923,962

(22) Filed: Oct. 27, 2015

(65) Prior Publication Data

US 2016/0115681 A1   Apr. 28, 2016

(30) Foreign Application Priority Data

Oct. 28, 2014   (DE) .......................... 10 2014 015 991

(51) Int. Cl.
*E03D 5/01* (2006.01)
*E03F 1/00* (2006.01)
*E03C 1/182* (2006.01)
*E03D 11/08* (2006.01)
*B64D 11/02* (2006.01)

(52) U.S. Cl.
CPC ............ *E03D 5/01* (2013.01); *B64D 11/02* (2013.01); *E03C 1/182* (2013.01); *E03D 11/08* (2013.01); *E03F 1/006* (2013.01); *Y02T 50/46* (2013.01)

(58) Field of Classification Search
CPC . E03D 5/01; E03D 11/08; E03C 1/182; E03F 1/006; B64D 11/02

USPC .......................................................... 4/431
See application file for complete search history.

(56) References Cited

U.S. PATENT DOCUMENTS

| 5,421,040 A | 6/1995 | Oldfelt |
| 5,966,784 A | 10/1999 | Arbogast et al. |
| 2008/0237397 A1 | 10/2008 | Seibt |

(Continued)

FOREIGN PATENT DOCUMENTS

| DE | 9412090 U1 | 1/1996 |
| DE | 69812493 T2 | 2/2004 |

(Continued)

*Primary Examiner* — Tuan N Nguyen
(74) *Attorney, Agent, or Firm* — Scully Scott Murphy and Presser; Frank Digiglio

(57) ABSTRACT

A waste disposal apparatus for an aircraft comprising a basin for receiving liquid and/or solid pollutants, comprising a lid for closing off the basin, comprising a feed arrangement for supplying an air-water mixture, wherein the feed arrangement has an air-water mixing device for providing the air-water mixture and a distributing device for distributing the air-water mixture in the basin, and comprising a lead-off arrangement for leading off the effluent formed from the air-water mixture containing the pollutants, wherein the lead-off arrangement opens out into an outlet from the basin and the lead-off arrangement can be subjected to an underpressure, so that the air-water mixture, when the lid is closed, is sucked into the basin via the distributing device is proposed, wherein the air-water mixing device has an air duct and a nozzle for the dispensing of water and the water can be subjected to an overpressure and wherein the distributing device and the basin are jointly designed such that the water-air mixture is guided in a cyclonic and/or helical path from the distributing device into the outlet.

15 Claims, 4 Drawing Sheets

(56) References Cited

U.S. PATENT DOCUMENTS

2009/0300834 A1 12/2009 Hoffjann et al.
2010/0180369 A1  7/2010 Seibt

FOREIGN PATENT DOCUMENTS

| DE | 102005054887 A1 | 6/2007 |
| DE | 102007013949 A1 | 9/2008 |
| DE | 102007031903 A1 | 1/2009 |

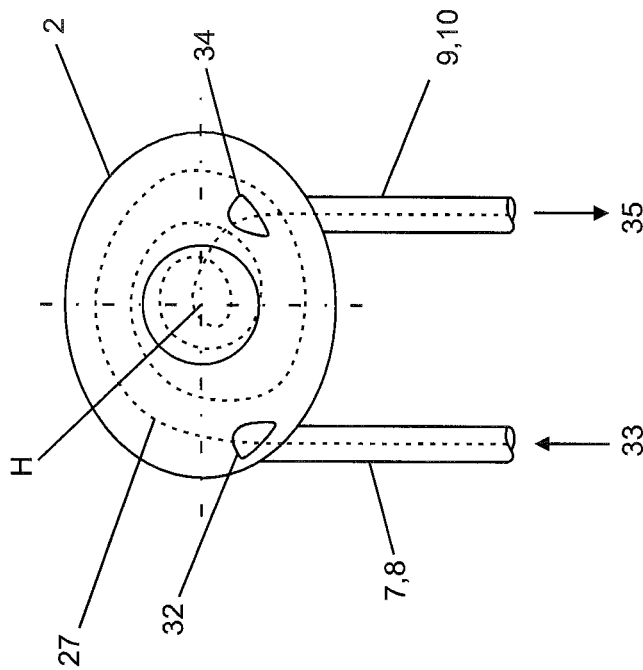
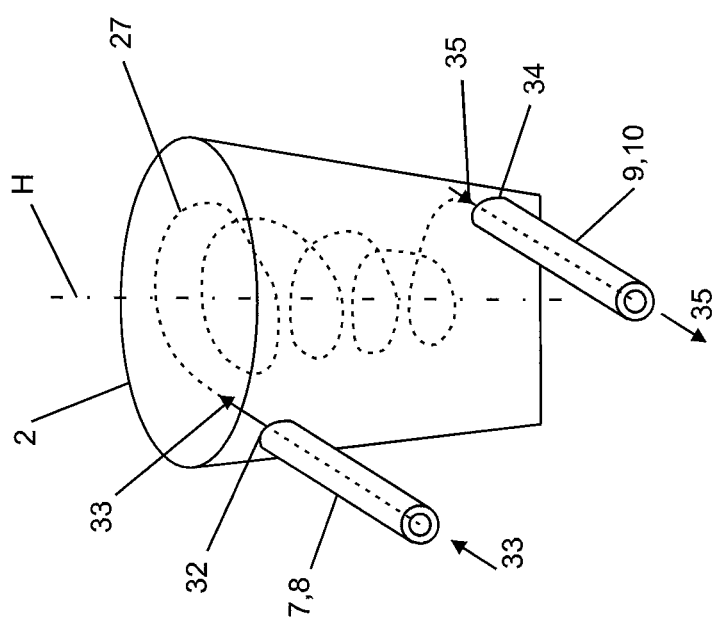

WASTE DISPOSAL APPARATUS FOR AN AIRCRAFT AND AIRCRAFT COMPRISING THE WASTE DISPOSAL APPARATUS

BACKGROUND OF THE INVENTION

The invention relates to a waste disposal apparatus for an aircraft, comprising a basin for receiving liquid and/or solid pollutants, comprising a lid for closing off the basin, comprising a feed arrangement for supplying an air-water mixture, wherein the feed arrangement has an air-water mixing device for providing the air-water mixture and a distributing device for distributing the air-water mixture in the basin, comprising a lead-off arrangement for leading off the effluent formed from the air-water mixture containing the pollutants, wherein the lead-off arrangement opens out into an outlet from the basin and the lead-off arrangement can be subjected to an underpressure, so that the air-water mixture, when the lid is closed, is sucked into the basin via the distributing device. In addition, the invention relates to an aircraft comprising this waste disposal apparatus.

DISCUSSION OF THE PRIOR ART

In aircraft, different types of wastes or pollutants arise in the passenger region. An indispensable component in passenger aircraft is, for example, the aircraft toilet and the closely associated question of the disposal of excrement. Certainly it would be possible to configure an aircraft toilet analogously to a conventional toilet, but in this case the water requirement for a flushing operation would likewise be comparable with the water requirement of a conventional toilet. In aircraft applications, the emphasis has logically to be placed, however, on weight savings, in order ultimately not to unnecessarily reduce the payload of the aircraft or unnecessarily increase the fuel requirement of the aircraft. In addition, the considerable quantities of fresh water and grey water which are respectively required and generated by a conventional toilet would have to be laboriously exchanged during a stopover of the aircraft at an airport. For this reason, vacuum toilets in which excrement is drawn off from the toilet bowl into a collecting tank by means of a so-called vacuum system have already been proposed, wherein vacuum systems of this type are distinguished by the lower water requirement.

A vacuum toilet of this type is disclosed, for instance, in printed publication DE 10 2005 054 887 A1. In this printed publication, it is recognized as a problem that the flush water has to be pressurized, for instance, by means of an additional pump before it is fed to the WC. As a solution it is proposed that a toilet bowl having a vacuum effluent line is connectable via a flush valve to a vacuum system, and a spraying apparatus, which is disposed in the toilet bowl and is connected via a Venturi tube to the flush water reservoir, is provided. When the flush valve is opened, an underpressure is generated in the vacuum effluent line. Due to a pressure difference between vacuum and cabin air an air stream is generated, by which, by means of the Venturi effect, flush water contained in the flush water reservoir is sucked up, sprayed by means of the spraying apparatus into the toilet bowl and sucked into the vacuum water line.

SUMMARY OF THE INVENTION

The object of the invention is to propose an improved waste disposal apparatus for an aircraft.

Thus, a waste disposal apparatus which is suitable and/or configured for an aircraft is proposed within the scope of the invention. Although in principle it is possible for the waste disposal apparatus to be used also in connection with other mobiles, due to the ambient conditions during operation of an aircraft the waste disposal apparatus can be used particularly advantageously in this. This is particularly because, during high-altitude operation of the aircraft, a pressure difference exists between the environment and the cabin interior of the aircraft, which pressure difference can be utilized by the waste disposal apparatus in the flushing operation.

The waste disposal apparatus comprises a basin which is suitable and/or configured for the reception of liquid and/or solid pollutants. The basin can have in top view, for example, a circular, oval, rectangular or square opening cross section. A basin with free-form contour is also conceivable within the scope of the invention. The liquid and/or solid pollutants can be constituted by excrement, in alternative embodiments, however, also by food remnants, slop water and other pollutants.

The waste disposal apparatus has a lid, which serves to close off the basin, in particular an opening of the basin. The lid is preferably configured as a hinged lid, so that this can assume an open state and a closed state. In the closed state, the lid rests squarely on the basin.

The waste disposal apparatus has a feed arrangement, wherein the feed arrangement comprises an air-water mixing device and a distributing device. The air-water mixing device serves to provide an air-water mixture. The distributing device is configured to distribute the air-water mixture in the basin. In particular, the distributing device forms an inlet of the feed arrangement in the basin. The air-water mixing device is disposed, in particular, in a feed of the feed arrangement to the inlet.

The waste disposal apparatus further has a lead-off arrangement, which is configured to lead off the effluent formed from the air-water mixture and the optional pollutants. The effluent can be exclusively solid and/or liquid, yet can also be configured as an air-effluent mixture. The lead-off arrangement is fluidically connected to an outlet of the basin and can be subjected to an underpressure. In particular, the lead-off arrangement is fluidically connectable and/or connected to an underpressure system or an underpressure region. From a functional aspect, it is provided that, when the lead-off arrangement is subjected to the underpressure and when the lid is closed, the air-water mixture is sucked into the basin via the distributing device and is subsequently sucked out of the basin via the outlet. In-between, the air-water mixture serves to flush the basin.

The air-water mixing device has an air duct, in particular an air guidance pipe, wherein in the air duct is disposed a nozzle for the dispensing of water. It is provided that the water dispensed via the nozzle is mixed with the air in the air duct, so that the air-water mixture is formed. In the most general manifestation of the invention, the nozzle can be arranged with any position and orientation, wherein the opening cross section of the nozzle can assume any size or shape.

Within the scope of the invention, it is proposed that an overpressure can be subjected to the water, in particular such that an overpressure is formed in the supply line of the nozzle. The overpressure and/or underpressure should here be regarded relative to an ambient pressure of the waste disposal apparatus in the aircraft, in particular relative to a cabin internal pressure. The advantage of the invention can be seen in the fact that, as a result of the pressurization of the water, the pressure difference between the air guided in the air duct and the supplied water is spread very wide. This means that the mixing of the air and water is improved and can achieve an improved cleaning effect in the basin. Particularly preferably, the overpressure in the supply line amounts to at least 2 bar, preferably at least 3 bar.

According to the invention, the distributing device is configured as one or more injection opening(s), wherein the injection direction of the injection openings is oriented such that the cyclone or the helical vortex is generated or at least supported. For instance, the injection direction of the injection openings is not purely vertical, but is oriented at an intermediate angle lying between vertical and horizontal. For instance, the intermediate angle related to the horizontal is chosen smaller than 45 degrees, preferably smaller than 30 degrees, in order to generate the cyclone and/or helical vortex.

In a preferred refinement of the invention, the waste disposal apparatus has a water supply for supplying the nozzle with the water, wherein the water supply supplies the pressurized water. It can be provided that the water supply is configured as a separate sub-assembly assigned to the waste disposal apparatus. Preferably, the water supply is configured as the aircraft water supply, which, in an on-board water supply system, provides the water for a plurality of consuming units.

In a preferred embodiment of the invention, the nozzle is arranged centrally or centrically. Thus the inventive embodiment of the waste disposal apparatus differs from the prior art particularly by virtue of the fact that only so-called Venturi tubes have hitherto been used to provide an air-water mixture. In the invention, by contrast, it is provided that the centrally arranged nozzle for the dispensing of water in the air duct is used for this function.

In particular, the air-water mixing device is configured as a jet pump device, wherein at the water obtains the overpressure, and at the entrance of the air duct a room ambient pressure, in particular an internal cabin pressure of the aircraft, and at the exit of the lead-off arrangement an underpressure which is reduced in relation to the room ambient pressure. Thus, by way of the pressure gradient between the exit and the entrance, an air stream is generated, wherein the air pressure prevailing in the region of the nozzle is reduced in relation to the overpressure obtaining at the outlet of the nozzle for the water. In this way, water is sucked out of the nozzle due to the pressure difference or is forced out of the nozzle due to the overpressure. The jet pump technology produces a very readily usable air-water mixture, which in field tests has shown very good cleaning effects in the basin, combined with low water requirement.

In particular, the air-water mixture is configured as an aerosol.

The advantage of the invention can thus be seen in the fact that, by virtue of the structure of the air-water mixing device, an improved way of providing the air-water mixing device is achieved. The inventive design is in this case simple and inexpensive to implement and to integrate.

In a preferred embodiment of the invention, a jet direction of the nozzle is oriented equidirectionally and/or parallelly to the longitudinal extent of the air duct and/or to an air stream in the air duct. In particular, the jet direction is directed in the direction of the inlet, in the transverse direction or in opposite direction to the inlet of the basin. In the case of the last-named option, the intermixing is improved.

It is here particularly preferably provided that the air duct has a cross-sectional area, in particular a free cross-sectional area, in the region or in a plane perpendicular to the air stream and/or perpendicular to the longitudinal extent of the air duct, and at the same time, level with the discharge opening of the nozzle, of at least 3 square centimeters, preferably of at least 6 square centimeters, and, more specifically, exactly or at least 12 square centimeters. The comparatively large cross-sectional area means that a blockage of the feed arrangement, in particular of the air duct, as a result of an unwanted backflow, or other operating disturbances, is made almost impossible. The waste disposal apparatus according to the invention is thus less prone to breakdown and very reliable.

In order to avoid a separation of air and water in the air-water mixture, it is preferably provided that a flow path starting from the air duct towards the nozzle, or a flow path from the nozzle into the basin, has a free cross section greater than 3 square centimeters, preferably greater than 4 square centimeters. In particular, a spraying nozzle in the inlet region of the basin is dispensed with, since the cleaning effect is intended to be realized by the air-water mixture, in particular the aerosol, and not by a cross-sectionally tapered spraying nozzle.

In a preferred refinement of the invention, the nozzle is configured as a full-cone nozzle, in particular as a full-circle nozzle. This structural form of nozzles has a conical spray pattern with circular impact area. The full-cone nozzle can here be configured as a tangential full-cone nozzle, in particular with an eddy chamber, or as an axial full-cone nozzle, in particular with a swirl mixing chamber, or as a bunching nozzle with a plurality of mutually offset individual nozzles. It is also possible for the nozzle to be realized such that the resultant spray pattern forms a spiral, so that a rotation of the water particles about an axis which is formed by the air stream in the air duct or by the longitudinal extent of the air duct is already achieved.

In addition, it is preferred that also the cross section or the cross-sectional area of the air duct is of circular or rectangular arrangement, wherein the full-cone nozzle is arranged centrally or centrically such that the spray pattern of the nozzle is arranged coaxially and/or concentrically and/or centrically to the cross-sectional area of the air duct. This specific arrangement means that the complete cross-sectional area of the air duct is evenly supplied with water from the full-cone nozzle and hence the water-air mixture can be provided particularly effectively.

In a preferred refinement of the invention, the distributing device and the basin are jointly designed such that the water-air mixture is guided in a cyclone and/or in a helical vortex from the distributing device into the outlet. Thus, during operation, trajectories of the water-air mixture which extend helically or spirally on the walls of the basin, from the inlet to the outlet, are produced. As a result of the particular guidance of the water-air mixture, the path of the water-air mixture in the basin and, in particular, on the walls of the basin is artificially lengthened, so that the cleaning effect, related to a volume of the water-air mixture, is particularly high. It can here also be provided that the water-air mixture, on the path between inlet and outlet, transforms into an effluent mixture.

In an advantageous realization of the invention, an injection direction of the air-water mixture into the basin is oriented tangentially to a vertical axis of the basin and/or a suck-off direction of the outlet tangentially to the vertical axis of the basin. In design terms, this can be realized by a tangential orientation of the injection opening and/or of the outlet. The vertical axis as a notional auxiliary structure is oriented, in particular, perpendicularly and arranged centrally or centrically in the basin. As a result of this design, the formation of the cyclone and/or of the helical vortex is realized or promoted.

In a preferred design realization of the invention, the lid and/or the bearing surface of the basin for the lid is configured such that an underpressure-tight and/or vacuum-tight closure is formed. In particular, the lid and the basin have a locating surface and bearing surface respectively, which jointly form an airtight closure. In particular, the waste disposal apparatus is designed such that, when the lead-off arrangement is subjected to the underpressure, the lid is drawn nearer to the basin. The airtight and/or underpressure-resistant closure means that the obtaining underpressure can be used for the provision and guidance of the air-water mixture.

From a design aspect, it is preferred that the lead-off arrangement has a lead-off line and an underpressure valve, wherein the lead-off line is fluidically connectable and/or connected to the underpressure region, and wherein the underpressure valve is configured as a check valve and can open and close the lead-off line.

It is also preferred that the feed arrangement has a water valve and a feed line, wherein the water supply is fluidically connected via the feed line to the nozzle, and wherein the water valve is configured as a check valve, which can open and close the feed line from the water supply to the nozzle. For instance, the underpressure valve and/or the water valve is/are configured as a solenoid valve.

In a refinement of the invention, the waste disposal apparatus has a control mechanism, which is configured to drive at least one of the valves, preferably both valves, during a flushing operation. In particular, the control mechanism is configured in terms of program technology and/or circuit technology to, during the flushing operation of the waste disposal apparatus, on the one hand open the underpressure valve in order to subject the lead-off arrangement to the underpressure, and on the other hand open the water valve, so that pressurized water can be injected to provide the air-water mixture. In a preferred embodiment of the invention, the waste disposal apparatus has an actuating device, which is configured, for instance, as a switch or key, wherein the actuating device activates the control mechanism for the flushing operation, so that this can realize the flushing operation and, in particular, the driving of the valve or valves.

In a preferred realization of the invention, the basin is configured as a toilet bowl and/or the waste disposal apparatus as a vacuum toilet.

In an alternative embodiment of the invention, the basin is configured as a sink, in particular as a kitchen sink, and/or the waste disposal apparatus as a flushing device—also termed a Galley Waste Disposal Unit (GWDU). It has turned out, in fact, that specifically this waste disposal technology can be used particularly well in sinks, in particular kitchen sinks, for washing out kitchen waste.

A further subject of the invention is formed by an aircraft comprising the waste disposal apparatus as this has previously been described or according to one of the preceding claims. The waste disposal apparatus is particularly preferably configured as the flushing device or as the vacuum toilet. In this subject of the invention, it is particularly preferred that the underpressure region is configured as an artificial underpressure, for example from a vacuum pump, or is formed by the outer region of the aircraft at high altitude. At higher altitude, the room ambient pressure within the aircraft, in particular within the passenger and/or cabin region of the aircraft, in fact differs from the outer region of the aircraft by more than 300 millibar, in particular more than 500 millibar. Preferably, the water supply is configured as the aircraft water supply, which in an on-board water supply system provides the water for a plurality of consuming units. At an overpressure of at least 2 to 3 bar, a pressure difference between air and water of at least 2 bar to 3.5 bar is thus obtained.

BRIEF DESCRIPTION OF THE DRAWINGS

Further features, advantages and effects of the invention emerge from the following description of a preferred illustrative embodiment of the invention and from the accompanying figures, wherein:

FIGS. 4a, b show a schematic representation of the basin of the waste disposal apparatus for illustration of the fluidic behaviour.

DETAILED DESCRIPTION OF THE INVENTION

Figure 1:
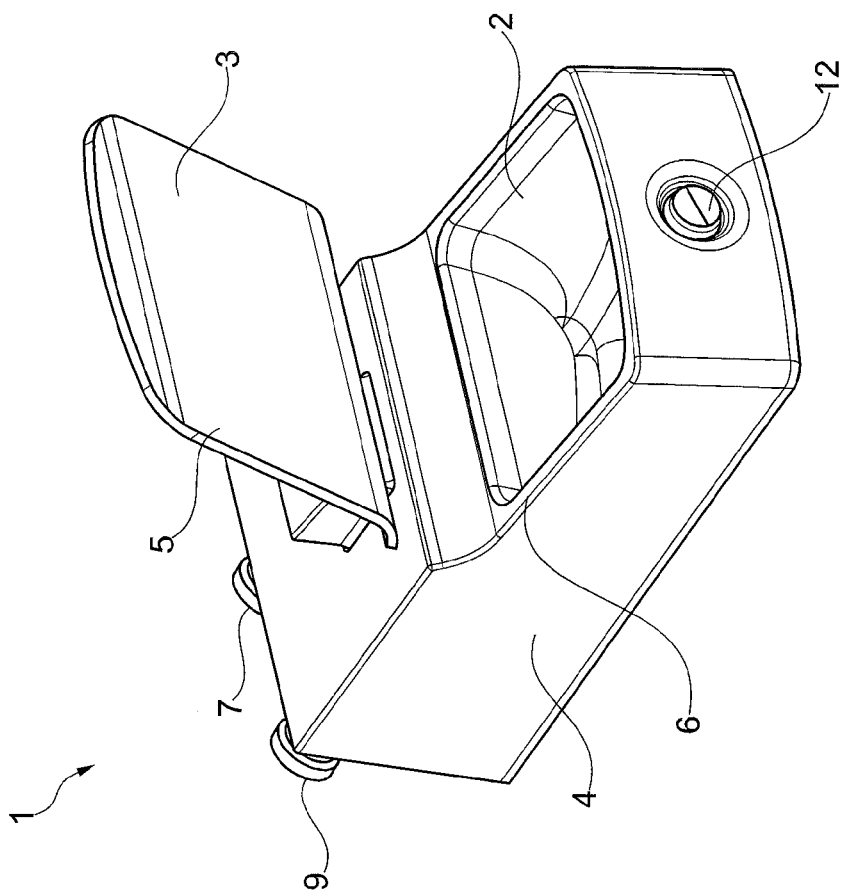
FIG. 1 shows a schematic three-dimensional representation of a waste disposal apparatus configured as a kitchen sink as a first illustrative embodiment of the invention.

FIG. 1 shows in a schematic three-dimensional representation a waste disposal apparatus 1, which is configured as a kitchen sink or as a GWDU Galley Waste Disposal Unit, as an illustrative embodiment of the invention.

The waste disposal apparatus 1 comprises a basin 2, which in the illustrative embodiment is realized as the actual sink. In a schematic top view from above, the basin 2 has a rectangular base area. The waste disposal apparatus 1 further has a lid 3, which is disposed in hinged arrangement on a basic element 4 of the waste disposal apparatus 1. In the shown state, the lid 3 is open. For a flushing operation the lid 3 can be closed, whereupon the lid 3 rests with circumferential locating surfaces 5 sealingly on circumferential locating surfaces 6 of the basin 2 or of the basic element 4.

Figure 2:
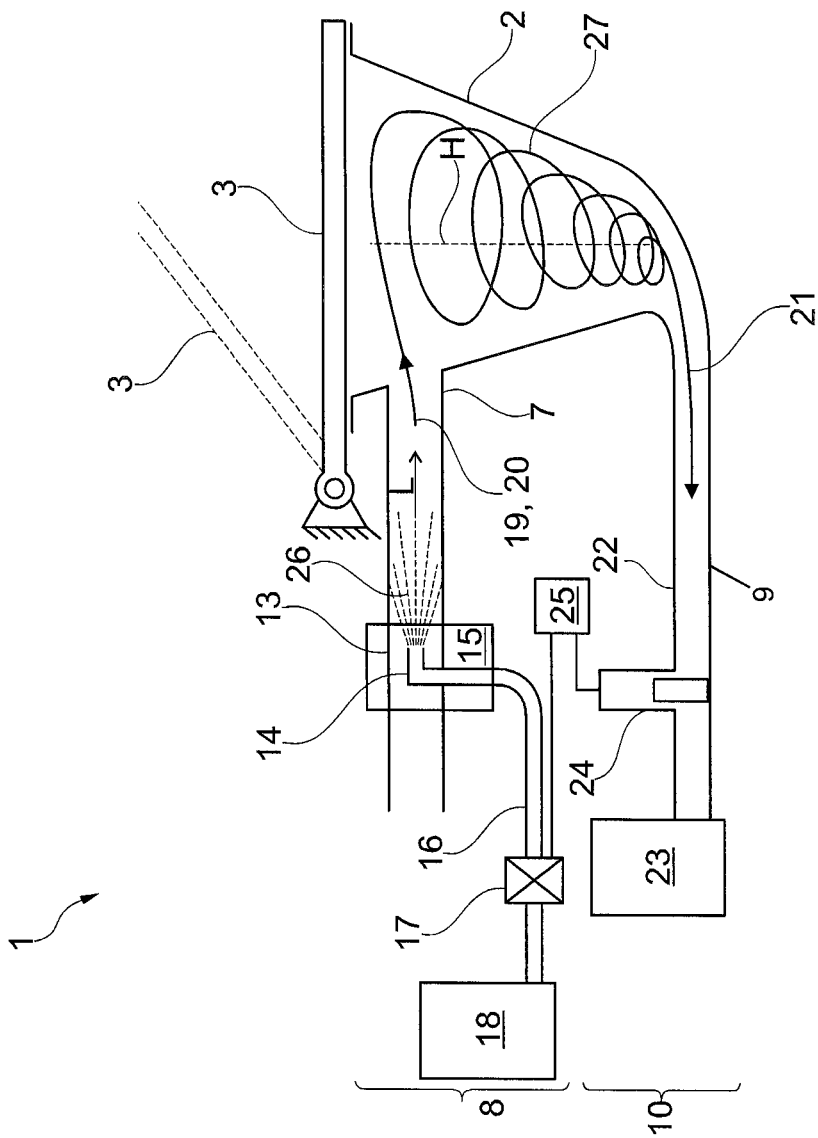
FIG. 2 shows a schematic cross section through a or the waste disposal apparatus.

The waste disposal apparatus 1 has a first connector 7 for the connection of a feed arrangement 8 (FIG. 2) and a second connector 9 for the connection of a lead-off arrangement 10 (FIG. 2). The waste disposal apparatus 1 is disposed in an aircraft 11, which is illustrated only as a schematic block. On the front side of the waste disposal apparatus 1 is located an actuating device 12, which is configured as a button or as a key, wherein the waste disposal apparatus 1, upon actuation of the actuating device 12, starts a flushing operation.

For the description of the functional structure of the waste disposal apparatus 1 reference is made to FIG. 2, which represents a schematic cross section of the waste disposal apparatus 1 according to FIG. 1 or of any other waste disposal apparatus 1 which can also be configured, for instance, as an aircraft vacuum toilet.

In the schematic representation, of the waste disposal apparatus 1 again the lid 3 can be recognized, this being shown, on the one hand, in dashed representation in the open state and, on the other hand, with continuous lines in the closed state, wherein it rests sealingly on the basin 2.

Via the first connector 7 is provided the feed arrangement 8 and via the second connector 9 is provided the lead-off arrangement 10. The feed arrangement 8 has an air guidance pipe in the form of an air duct 13, which has a rectangular cross section and which is mounted on the first connector 7. In alternative embodiments of the invention, the air guidance pipe can also be plugged into the basin 2 or be integrally connected thereto. The first connector 7 is thus not imperative. The air duct 13 is fluidically coupled with the interior of the aircraft 11. In the air duct 13 is disposed a nozzle 14, wherein air duct 13 and nozzle 14 jointly form an air-water mixing device 15. The nozzle 14 is connected via a feed line 16, and with the interposition of a water valve 17, to a water supply 18. The water supply 18 is configured as an aircraft water supply, which in an on-board water supply system provides the water for a plurality of consuming units. The water supply 18 provides the water under an overpressure of at least 2 to 3 bar, wherein the overpressure is measured in relation to the cabin internal pressure. The feed arrangement 8 or the air duct 13 is connected, in particular via the first connector 7, to a distributing device 19, wherein the distributing device 19 forms an inlet 20 into the basin 2. In the simplest embodiment, the distributing device 19 can be configured as a recess in the basin 2.

The lead-off arrangement 10 is connected, in particular via the second connector 9, to an outlet 21 of the basin 2. In this example, the outlet 21 is situated lower than the inlet 20 when the waste disposal apparatus 1 is in an operative position. The lead-off arrangement 10 comprises a lead-off line 22, via which the outlet 21 is connectable to an underpressure region 23. In the case of the aircraft 11, the underpressure region 23 can be, for instance, a region which is fluidically coupled with an outer region of the aircraft 11, since, at higher altitudes, the external air pressure is reduced in relation to the internal air pressure of the aircraft 11 such that an underpressure is obtained. Alternatively, and possibly reversibly, the underpressure is generated in the underpressure region 23 by an evacuating pump or a vacuum pump. The lead-off arrangement 10 further has an underpressure valve 24, wherein the underpressure valve 24 is configured as a check valve for shutting off and opening the lead-off line 22.

For a flushing operation for flushing out liquid and/or solid pollutants in the basin 2, the lid 3 is firstly closed and the basin 2 thereby closed at the fill opening of the basin 3 in an underpressure-resistant, airtight or sealing manner.

The waste disposal apparatus 1 has a control mechanism 25, which is configured to drive the water valve 17 and the underpressure valve 24. By actuation of the actuating device 12 or by another trigger, the control mechanism 25 is activated and controls the underpressure valve 24 and the water valve 17 simultaneously or with a stagger. Both the underpressure valve 24 and the water valve 17 are opened. As a result of the underpressure obtaining at the lead-off arrangement 10, via the outlet 21, the inlet 20 and the air duct 13, air is sucked in from the fluidically connected surroundings and accelerated in an air guidance direction L. At the same time the water valve 17 is opened, whereupon the water is pressurized and is thus present with overpressure at the nozzle 14. The obtaining underpressure also in the region of the air-water mixing device 15 means that the water is sucked out of the nozzle 14 and, as a result of the obtaining overpressure at the water supply 18, is additionally forced out, so that, in a mixing region disposed fluidically after the air-water mixing device 15, an air-water mixture 26 is obtained. This air-water mixture is configured, in particular, as an aerosol.

The air-water mixture 26 is sucked into the basin 2 via the inlet 20. The distributing device 19 and optionally, in addition, the shape of the basin 2 are mutually coordinated such that the air-water mixture 26 is not sucked to the outlet 21 by the shortest route, but is conveyed to the outlet 21 via a cyclonic and/or helical path 27 which spirals about a vertical axis H. As a result of the helical path 27, a very high cleaning effect is produced within the basin 2. The conversion of the water into an air-water mixture 26 means that even very small quantities of water are sufficient to clean and flush the basin 2. The air-water mixture 26, possibly ridden with pollutants, or water containing the pollutant, is sucked at the end of the helical path 27 via the outlet 21, past the underpressure valve 24, into a collecting tank (not represented).

It should be underlined that, insofar as the underpressure region 23 is formed by an outer region of the aircraft 11, the flushing of the basin 2 of the waste disposal apparatus 1 can be realized almost without the use of electrical energy and, moreover, with very small quantities of water.

Figure 3B:
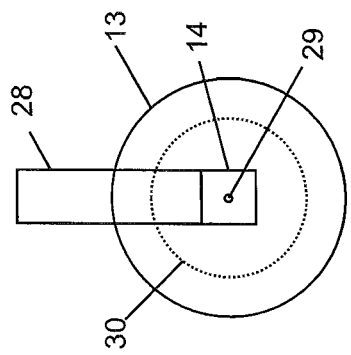
FIGS. 3a, b show a schematic longitudinal section and cross section through the feed arrangement for the waste disposal apparatus according to one of the preceding figures.
Figure 3A:
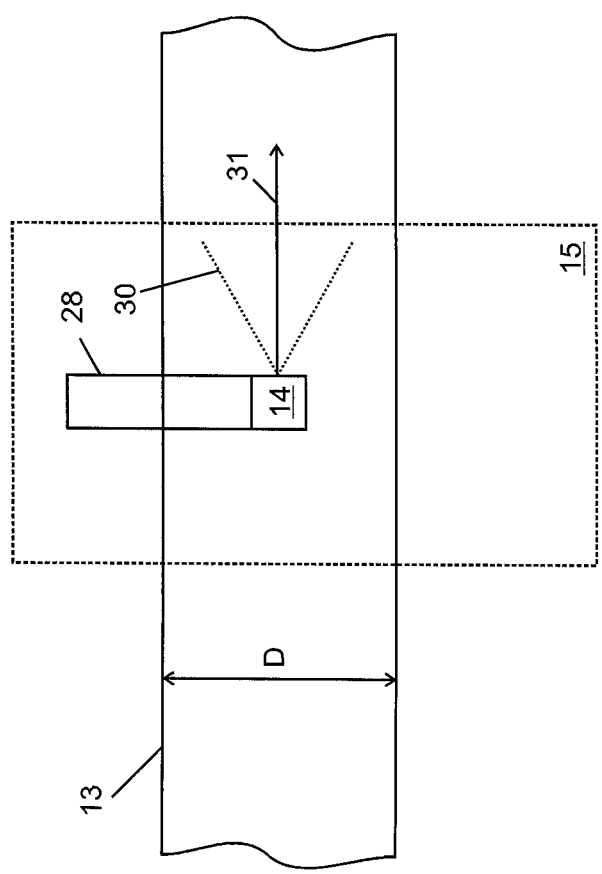

FIGS. 3a, b show a schematic representation of the air-water mixing device 15, wherein, in FIG. 3a, a schematic side view or a longitudinal section and, in FIG. 3b, an axial top view is shown. It can be seen that the nozzle 14 is arranged selectively from above or from below, via a support part 28, centrically or centrally in the air duct 13. In the top view, it can even be seen that a nozzle exit 29 of the nozzle 14 is arranged coaxially or concentrically to the air duct 13.

The nozzle 14 is configured as a full-cone nozzle, which dispenses the water in a conical spray pattern 30 with a jet direction 31 which is equidirectional to the air stream or to the longitudinal extent of the air duct 13. In FIG. 3b, the conical spray pattern 30 is shown frontally from the front, wherein it can be seen that this is likewise arranged concentrically and coaxially to the air duct 13. It should further be underlined that the air duct 13 has a free diameter D of greater than 3 centimeters, preferably greater than 5 centimeters, so that a high-volume mixing between water and air stream can take place.

The flow path between the air-water mixing device 15 and the inner region of the basin 2 has throughout a free cross section which is always configured greater than 3 or 4 square centimeters, so that a separation of the aerosol into the constituent parts air and water between the air-water mixing device 15 and the basin 2 is avoided. The aerosol has a different and/or better cleaning effect in relation to a water injected via spraying nozzles.

FIGS. 4a, b show a schematic three-dimensional view and a top view of the basin 2 of the waste disposal apparatus 1 for the description of the fluidic function.

The basin 2 has the vertical axis H, which is arranged perpendicularly and is located centrically in the basin 2. With reference to the vertical axis H, the first connector 7 with the feed arrangement 8 is higher than the second connector 9 with the lead-off arrangement 10. In the basin 2, the first connector 7 forms a injection opening 32, which constructively defines a injection direction 33 of the air-water mixture 26. The injection direction 33 is oriented tangentially to the vertical axis H, so that the injection direction 33 constitutes the beginning of the cyclonic and/or helical path 27.

Secured by the second connector 9 is an outlet opening 34, which constructively defines an outlet direction 35. The outlet direction 35 is arranged tangentially to the cyclonic and/or helical path 27, wherein the injection opening 32 defines a beginning of the cyclonic and/or helical path 27, and the outlet opening 34 an end of the cyclonic and/or helical path 27. The inner wall of the basin 2 is configured such that the cyclonic and/or helical path 27 can develop. In particular, the inner wall is realized in the shape of a shell. The injection direction 33 and the outlet direction 35 are arranged in parallel, yet vertically offset from each other. In the top view according to FIG. 4b, it can be seen that the outlet opening 34 sits on a smaller radius in comparison to the injection opening 32. The injection opening 32 is configured greater than 3 or 4 square centimeters.

REFERENCE SYMBOL LIST 1 waste disposal apparatus
2 basin
3 lid
4 basic element
5 locating surfaces
6 locating surfaces
7 first connector
8 feed arrangement
9 second connector
10 lead-off arrangement
11 aircraft
12 actuating device
13 air duct
14 nozzle
15 air-water mixing device
16 feed line
17 water valve
18 water supply
19 distributing device
20 inlet
21 outlet
22 lead-off line
23 underpressure region
24 underpressure valve
25 control mechanism
26 air-water mixture
27 cyclonic and/or helical path
28 support part
29 nozzle exit
30 conical spray pattern
31 jet direction
32 injection opening
33 injection direction
34 outlet opening
35 outlet direction
D free diameter
H vertical axis
L air guidance direction

What is claimed is:

1. A waste disposal apparatus for an aircraft comprising:
a basin for receiving liquid and/or solid pollutants,
a lid for closing off the basin,
a feed arrangement for supplying an air-water mixture, wherein the feed arrangement has an air-water mixing device for providing the air-water mixture and a distributing device for distributing the air-water mixture in the basin,
a lead-off arrangement for leading off the effluent formed from the air-water mixture containing the pollutants, wherein the lead-off arrangement opens out into an outlet from the basin and the lead-off arrangement can be subjected to an underpressure, so that the air-water mixture, when the lid is closed, is sucked into the basin via the distributing device,
wherein the air-water mixing device has an air duct and a nozzle for the dispensing of water and the water can be subjected to an overpressure, and wherein
the distributing device and the basin are jointly designed such that the water-air mixture is guided in a cyclonic and/or helical path from the distributing device into the outlet.

2. The waste disposal apparatus according to claim 1, comprising a water supply, wherein the water supply is fluidically connected to the nozzle and provides the pressurized water.

3. The waste disposal apparatus according to claim 1, wherein the nozzle is arranged centrally or centrically in the air duct.

4. The waste disposal apparatus according to claim 1, wherein the air duct has a cross-sectional area, in the region of a nozzle exit of the nozzle, of at least 3 square centimeters.

5. The waste disposal apparatus according to claim 1, wherein the air duct has a cross-sectional area, in the region of a nozzle exit of the nozzle, of at least 6 square centimeters.

6. The waste disposal apparatus according to claim 1, wherein a flow path starting from the air duct towards the nozzle and into the a free cross section greater than 3 square centimeters.

7. The waste disposal apparatus according to claim 1, wherein a flow path starting from the air duct towards the nozzle and into the a free cross section greater than 4 square centimeters.

8. The waste disposal apparatus according to claim 1, wherein an injection direction of the air-water mixture into the basin is oriented tangentially to a vertical axis (H) of the basin and/or an outlet direction of the outlettangentially to the vertical axis (H) of the basin.

9. The waste disposal apparatus according to claim 1, wherein the lid closes off the basin in an airtight and/or underpressure-resistant manner.

10. The waste disposal apparatus according to claim 1, wherein the lead-off arrangement has a lead-off line and an underpressure valve, wherein the lead-off line is fluidically connectable and/or connected to an underpressure region, and wherein the underpressure valve can open and close the lead-off line.

11. The waste disposal apparatus according to claim 1, wherein the feed arrangement has a water valve and a feed line, wherein the feed line connects the water supply via the water valve to the nozzle, wherein the water valve can open and close the feed line.

12. The waste disposal apparatus according to claim 11, comprising a control mechanism and an actuating device, wherein the control mechanism is configured to, following activation by the actuating device, start a flushing operation, by the control mechanism driving the underpressure valve and the water valve.

13. The waste disposal apparatus according to claim 1, wherein the basin is configured as a toilet bowl.

14. The waste disposal apparatus according to claim 1, wherein the basin is configured as a sink and/or as a kitchen waste basin.

15. An aircraft comprising the waste disposal apparatus according to claim 1.

* * * * *